United States Patent
Fisher

(10) Patent No.: US 11,012,509 B2
(45) Date of Patent: May 18, 2021

(54) CLOUD COMPUTING SERVER INTERFACE

(71) Applicant: HWM-WATER LIMITED, Cwmbran (GB)

(72) Inventor: Simon James Fisher, Cwmbran (GB)

(73) Assignee: HWM-WATER LIMITED, Cwmbran (GB)

(*) Notice: Subject to any disclaimer, the term of this patent is extended or adjusted under 35 U.S.C. 154(b) by 0 days.

(21) Appl. No.: 16/587,432

(22) Filed: Sep. 30, 2019

(65) Prior Publication Data
US 2020/0028913 A1    Jan. 23, 2020

Related U.S. Application Data

(63) Continuation of application No. PCT/GB2018/050890, filed on Mar. 29, 2018.

(30) Foreign Application Priority Data

Mar. 30, 2017   (GB) ..................... 1705079

(51) Int. Cl.
*H04L 29/08*     (2006.01)
*H04L 12/24*     (2006.01)

(52) U.S. Cl.
CPC ...... *H04L 67/1097* (2013.01); *H04L 41/0816* (2013.01); *H04L 67/2842* (2013.01)

(58) Field of Classification Search
CPC ............ H04L 67/1097; H04L 41/0816; H04L 67/2842; H04L 67/28; G06F 11/0727;
(Continued)

(56) References Cited

U.S. PATENT DOCUMENTS 9,534,929 B1    1/2017 Stamatakis et al.
2013/0332417 A1   12/2013 Kim
(Continued)

FOREIGN PATENT DOCUMENTS

EP      1879357 A1   1/2008
WO    2015194937 A1  12/2015

OTHER PUBLICATIONS

International Preliminary Report on Patentability for International Application No. PCT/GB2018/050890, dated Oct. 1, 2019, 13 pages, International Bureau of WIPO.
(Continued)

*Primary Examiner* — Chirag R Patel
(74) *Attorney, Agent, or Firm* — Heslin Rothenberg Farley & Mesiti P.C.

(57) ABSTRACT

A cloud computing server interface is described, the cloud computing server interface arranged to provide a platform for transferring data from, and updating the status of field devices for use in utilities monitoring. A cloud computing server interface comprising, a first data processing element arranged to communicate with a remote device having a remote device status; a first storage device having a first storage device status; and a second data processing element arranged to communicate with a second storage device having a second storage device status; wherein the first storage device is arranged to communicate with the first and second data processing elements; wherein the first data processing element is arranged to control data transfer from a remote device to the first storage device; wherein the second data processing element is arranged to control data transfer from the first storage device to a second storage device; wherein data transfer from the second data processing element to a second storage device is dependent upon a second storage device status; wherein data transfer from the second data processing element to a second storage device
(Continued)

comprises utilities management data. The invention aims to achieve a simple, reconfigurable platform for updating the status of field devices, while enabling more efficient use of power for extending battery life.

19 Claims, 2 Drawing Sheets

(58) Field of Classification Search
CPC ............ G06F 11/0793; G06F 11/3034; G06F 11/3051; G06F 11/3055; G06F 3/06; G06F 3/0604; G06F 3/0658; G06F 3/0673

See application file for complete search history.

(56) References Cited

U.S. PATENT DOCUMENTS

| | | |
|---|---|---|
| 2015/0046106 A1 | 2/2015 | Wade et al. |
| 2015/0339578 A1 | 11/2015 | Oliveira et al. |
| 2015/0364027 A1 | 12/2015 | Haupt et al. |
| 2016/0282819 A1* | 9/2016 | Zeier .................... G05B 13/028 |

OTHER PUBLICATIONS

International Search Report and Written Opinion of the International Searching Authority for International Application No. PCT/GB2018/050890 dated Jun. 25, 2018.

Search Report for Great Britain Application No. GB1705079.0 dated Sep. 29, 2017.

\* cited by examiner

CLOUD COMPUTING SERVER INTERFACE

CROSS REFERENCE TO RELATED APPLICATIONS

This application claims priority benefit from International Application No. PCT/GB2018/050890 filed on Mar. 29, 2018, which claimed priority from Great Britain Application No. 1705079.0 filed Mar. 30, 2017, each of which is incorporated herein by reference in its entirety.

FIELD OF THE INVENTION

The present invention relates to a cloud computing server interface, particularly a cloud computing server interface for utilities monitoring.

BACKGROUND OF THE INVENTION

The use of autonomous remote field devices in data collection has provided advances over manual data collection in that measurements can be obtained according to a strict schedule over longer periods and often in environments that would be unsuitable for humans. Remote field devices can also be used to inform additional systems of a change in conditions, activating a change in the operational output of a system. This may be used to highlight a change in the remote field device settings in anticipation of human reconfiguration, or may be used to initiate an autonomous reconfiguration driven by the system. Additional advantages to the use of autonomous remote field devices are in the provision of simultaneous synchronisation of data and automatic database population.

An example of current usage of remote field devices is for data collection in the utilities management industry. Such devices would be located within pipelines to monitor a number of measurands critical for indicating changes in the properties of the pipeline, together with those of the fluid flowing through. Properties such as fluid flow rate and fluid pressure can be used to inform a change in the amount of flow of fluid provided to the pipeline through a pressure reducing valve. At regions proximate the highest point within the network, or regions suffering the largest head loss, flow rate and pressure monitoring is essential to ensure sufficient continuous supply to these points. These remote field devices can optionally transmit packets of information relating to these properties via a wireless network to a server.

Problems that are invariably faced by such technology include ongoing costs associated with maintenance and server real estate. One key issue requiring frequent maintenance is untimely battery exhaustion. Batteries in such devices are often primary cells, such as alkaline or lithium batteries, the application of which is an economically viable model for "low cost, low drain" requirements such as for watches, hearing aids, and indeed remote field devices. The use of primary cells therefore requires suitable battery life optimisation, a need that is unmet by the currently available technology. In instances where such remote field devices are located in difficult-to-reach areas, the cost of battery replacement is compounded by the location and the need for additional labour time, equipment and manpower.

In instances where data collection is routed through a server, the cost of server memory usage can present an additional ongoing burden. Inefficient usage of server memory presents an unnecessary waste of both the available server memory and the monetary expense proportional to the memory usage.

Servers in use for transfer of information from remote field devices, such as the data loggers in the hereinbefore described example, are often used for several additional tasks meaning that accessibility of these servers for data transfer can be infrequent. Remote field devices desiring access to such a server for data transfer would be required to remain operational until such a time as the server becomes available for data transfer.

Based on the above-mentioned problems facing the currently available technology, it is therefore desirable to improve existing communications between a remote field device and a server.

SUMMARY OF THE INVENTION

In accordance with a second aspect of the present invention there is provided a cloud computing server interface comprising, a first data processing element arranged to communicate with a remote device having a remote device status; a first storage device having a first storage device status; and a second data processing element arranged to communicate with a second storage device having a second storage device status; wherein the first storage device is arranged to communicate with the first and second data processing elements; wherein the first data processing element is arranged to control data transfer from a remote device to the first storage device; wherein the second data processing element is arranged to control data transfer from the first storage device to a second storage device; wherein data transfer from the second data processing element to a second storage device is dependent upon a second storage device status; wherein data transfer from the second data processing element to a second storage device comprises utilities management data.

Here, an improved cloud computing server interface is provided capable of facilitating communication of data packets with remote devices. Aspects of the communications to remote devices are optimised. These optimisations are able to provide an enhanced efficiency in remote device battery usage, together with an enhanced efficiency in the usage of server real estate. These optimisations provide both environmental and economic advantages.

The invention provides for transfer of utilities management data from a remote device to a storage device in a manner that requires minimal remote device operation time. As a result, power usage by the remote device is minimised and thus battery life is maximised. The minimisation of remote device power usage during data transmission is minimised through the use of an intermediary first storage device arranged to hold the data from the remote device until such a time as a second device is available for data transfer. This provides an interface that is suitable for applications wherein access to a second storage device is in high demand. Transfer of data between a remote device and the first storage device is controlled by a first processing element. Transfer of data between the first storage device and a second storage device is controlled by a second processing element. The first processing element is also arranged to determine the status of a remote device. The status of the remote device comprises information about the settings of the device. Such settings may include variable information such as battery level; time; date; location; software version; schedule of communications with first processing element; signal strength, if using for instance a mobile phone signal for wireless communications; and additional self-diagnostics information. The settings may also include non-variable information such as unique identification numbers; serial numbers; date of manufacture; and firmware. Optionally, additional settings may also include environmental measurands such as temperature and pressure. In instances where the information transmitted by a remote device comprises the remote device status, the first processing element is enabled to provide reconfiguration information to a remote device. This reconfiguration information comprises alterations to the present settings, and may include a remote software or firmware update or instructions to communicate instead with an alternative cloud computing server interface which may optionally be located on a different server. The remote device communication received by the first processing element may be scheduled to include different information at alternate frequencies, for instance information is less likely to change may be sent daily whereas information that is highly variable may be communicated more frequently.

In one embodiment of the present invention, the first processing element is arranged to carry out compression and/or decompression of data transferred from a remote device to the first storage device. The second processing element is arranged to carry out compression and/or decompression of data transferred from the first storage device to a second storage device.

Server real estate can be a large financial expense and it is therefore beneficial to reduce these costs where possible. In order to make the transfer of data more economical, it is important that data to be transferred is able to be compressed (and therefore decompressed) at all sites of transfer in order to reduce the amount of memory occupied. In most cases this enables more economical use of available storage capacity.

The communication between the first processing element and a remote device may comprise at least one of steps:
  the first processing element identifies a remote device status;
  the first processing element provides reconfiguration instructions to a remote device; and
  the first processing element provides transfer of data from the remote device.

Communication is initiated by a remote device. In this way additions to a fleet of remote devices are not encumbered by the task of manually updating communication information for each remote device at the first processing element. Additional remote devices can therefore be added with ease, by communicating with a first processing portion, wherein the first processing element can provide the remote device with reconfiguration instructions. This enables the first processing element to adjust the settings of the additional remote device according to those required, which may optionally correspond to the settings of the rest of the fleet of remote devices. Optionally remote devices communicate with the first processing elements according to a predetermined schedule. The first processing element is also arranged to transfer data from the remote device.

In another embodiment of the present invention, the communication between the first processing element and the first storage device may comprise at least one of steps:
  the first processing element identifies the first storage device status; and
  the first processing element provides data transfer to the first storage device.

The first processing element is arranged to communicate with a remote device and a first storage device. The first processing portion is arranged to control transfer of data from a remote device to the first storage device. The transfer of data from a remote device to a first storage device includes a step of checking the status of the first storage device, wherein the first storage device status comprises its memory capacity. The transfer of data from a remote device to the first storage device can take place provided there is sufficient available memory for the data to be stored. Should there be insufficient memory in the first storage device to store the data from a remote device, it is preferable that reconfiguration instructions are provided from the processing portion to the remote device. These instructions comprise a delay in the provision of the data from the remote device, which may optionally be for a period until such a time as a next scheduled data transmission to the first processing portion. The transfer of data from a remote device to the first storage device initiates a change in status of the first storage device, which may optionally include data relating to the capacity of the first storage device or another indication that a transfer of data has occurred.

The communication between the second processing element and the first storage device may comprise at least one of steps:
  the second processing element identifies the first storage device status; and
  the second element provides data transfer from the first storage device.

The second processing element is arranged to communicate with the first storage device and a second storage device. The second processing element is further arranged to control data transfer between the first storage device and a second storage device. The communication with the first storage device comprises information on the first storage device status. The first storage device status comprises information relating to the capacity of the first storage device, and optionally another indication of whether data transfer has occurred between a remote device and the first storage device. Provided a satisfactory first storage device status is identified by the second processing element, the second processing element controls data transfer from the first storage device.

In another embodiment of the present invention, the communication between the second processing element and a second storage device comprises at least one of steps:
  the second processing element identifies a second storage device status; and
  the second element provides data transfer to a second storage device.

The second processing element is arranged to communicate with a second storage device. This communication includes the transmission of information relating to the status of a second storage device. The status of a second storage device comprises information relating the availability of a second storage device for data transfer. Optionally, the status of a second storage device might include data relating to the capacity of a second storage device. The status of the second storage device is checked at predetermined intervals. Provided identification of a satisfactory first storage device status and satisfactory second storage device status by the second processing element, the second processing element controls data transfer from the first storage device to the second storage device.

The remote device comprises a data logger; the first storage device comprises cache memory; a second storage device comprises a hard drive; the first storage device is located on a server; and a second storage device is located on a server.

In the present invention, the cloud computing server interface is used to transfer information from a data logger to a hard drive, wherein the addition of data loggers to a fleet is enabled through provision of communication with a first processing element. Transmission of data from the data logger to be stored is first transmitted to cache memory for temporary storage. This is in contrast to direct transmission to a permanent storage solution such as a hard drive, the availability of which for data transmission may be limited. In instances where a hard drive receives a large amount of data traffic, availability of a hard drive to transmission of data from a data logger may be infrequent. This would naturally require a data logger to remain operational until a permanent storage solution becomes available, thus causing unnecessary drain on the battery life of such data loggers. The transmission of data through a cache memory allows for a data logger to remain operational for a minimum amount of time and thus optimising the battery life of such data loggers. The business model for provision of data loggers, based upon their relative autonomy and general difficulty to access, it is typically more economical to include a primary cell as opposed to a secondary cell as a power source. As such it is important to maximise the life of these cells in order to avoid frequent recovery of a data logger for replacing the battery. Data loggers in the present embodiment would be used to measure temperature, water level, pressure and flow data within utilities management applications. Instructions to carry out these measurements may be comprised within the remote device status configurable and reconfigurable by the first processing element. The schedule for carrying out these measurements is comprised within the remote device status configurable and reconfigurable by the first processing element.

The transfer of data is carried out over a network supported by a server, and as such, the first storage device and the second storage device are located on a server.

Access to remote devices, and transfer of data from remote devices is enabled through the use of wireless transmission. Wireless transmissions are accessible to the first processing element, wherein the first processing element interacts with a first storage device located on a network server. The first storage device is arranged to transfer data to a second storage device which is located on a server. Optionally the first storage device and a second storage device are located on different servers.

In accordance with the present invention, there is provided a method of transferring data from a remote device to a second storage device using a cloud computing server interface as hereinbefore described, the method comprising the steps of:
  a first processing element acknowledges communication of a remote device;
  the first processing element identifies a type of communication provided by a remote device;
  the first processing element performs at least one task selected from the range:
    (i) provides reconfiguration information to the remote device; and
    (ii) provides the transfer of the received information to a first storage device;
  a second processing element identifies a change in a first storage device status, and proceeds to check a second storage device status at predetermined intervals; and
  if the second processing element identifies a satisfactory second storage device status, the second processing element proceeds to provide transfer of information from the first storage device to the second storage device.

In accordance with the method of the present invention, the second processing element checks said second storage device status using at least one of steps:
  the second processing element detects the storage capacity of said second storage device;
  the second processing element detects hardware parameters available on said second storage device;
  the second processing element detects the current activity of said second storage device;
  the second processing element detects a list of operations to be performed by said second storage device; and
  the second processing element calculates an estimated time of availability for data transfer of the second processing element.

Further, in accordance with the present invention, there is provided a computer program product including a program for a processing device, comprising software code portions for performing one or more of the steps of the method according to the first aspect, when the program is run on the processing device. The software code portions are for performing all of the steps of the method according to the first aspect, when the program is run on the processing device The computer program product comprises a computer-readable medium on which the software code portions are stored, wherein the program is directly loadable into an internal memory of the processing device.

BRIEF DESCRIPTION OF THE DRAWINGS

Specific embodiments of the invention will now be described by way of example only, and with reference to the accompanying drawings.

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

Figure 1:
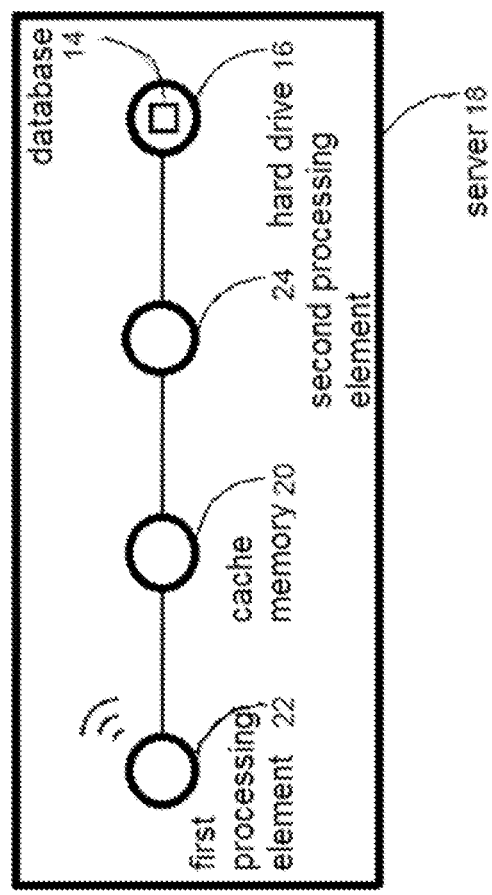
FIG. 1 shows a schematic diagram of a cloud computing server interface in accordance with the present invention.
Figure 1:
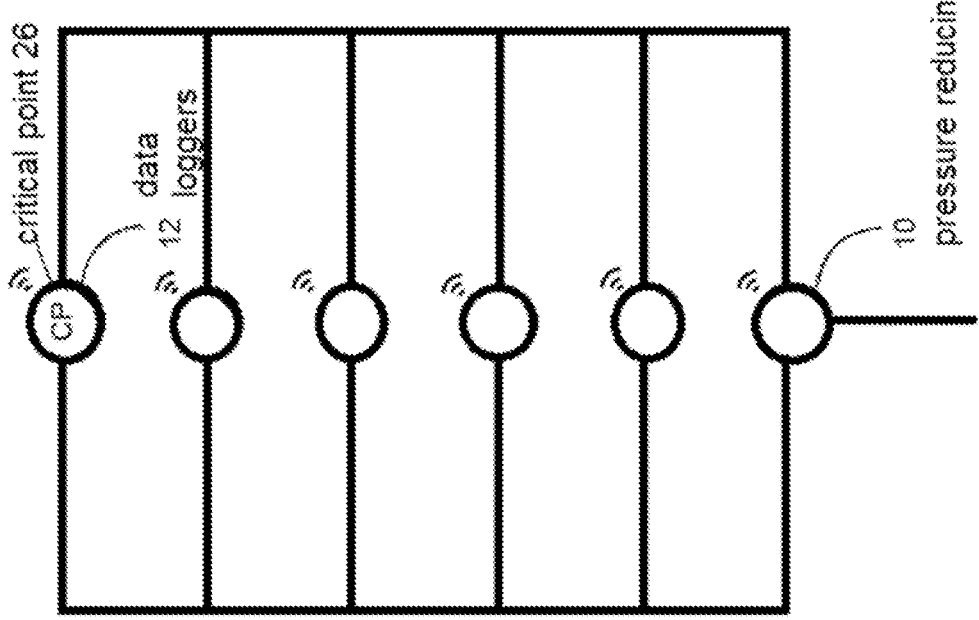

Referring to FIG. 1, a schematic diagram is provided of a cloud computing server interface according to a second aspect of the present invention. A fleet of remote devices 12 are situated within an established utilities pipeline network. In the embodiment shown, the network is a water distribution network. The remote devices 12 are data loggers situated at points throughout the network. The points at which the data loggers 12 are situated include a point in the pipeline network that suffers the most head loss, or pressure loss—typically the highest point—referred to as the critical point CP 26. Data loggers 12 are used to measure pressure and flow data, for instance at the critical point CP 26, in order to inform an adjustment of the available flow from a pressure reducing valve 10. Data loggers 12 are also optionally used to inform a database 14 used for compiling usage pattern data including water usage data based upon pressure/flow data by predetermined time increments, for instance by hour, day, week and month. Database 14 is located on a second storage device 16, which in the presently described embodiment is a hard drive on a server 18. The server 18 is utilized for a number of data communications and as such data traffic is high, and availability to store data transmitted from the data loggers 12 is infrequent.

Server 18 also comprises a first storage device 20, which in the present embodiment is cache memory, along with a first processing element 22 arranged to communicate with data loggers 12 and the cache memory 20; and a second processing element 24 arranged to communicate with the cache memory 20 and the hard drive 16.

Figure 2:
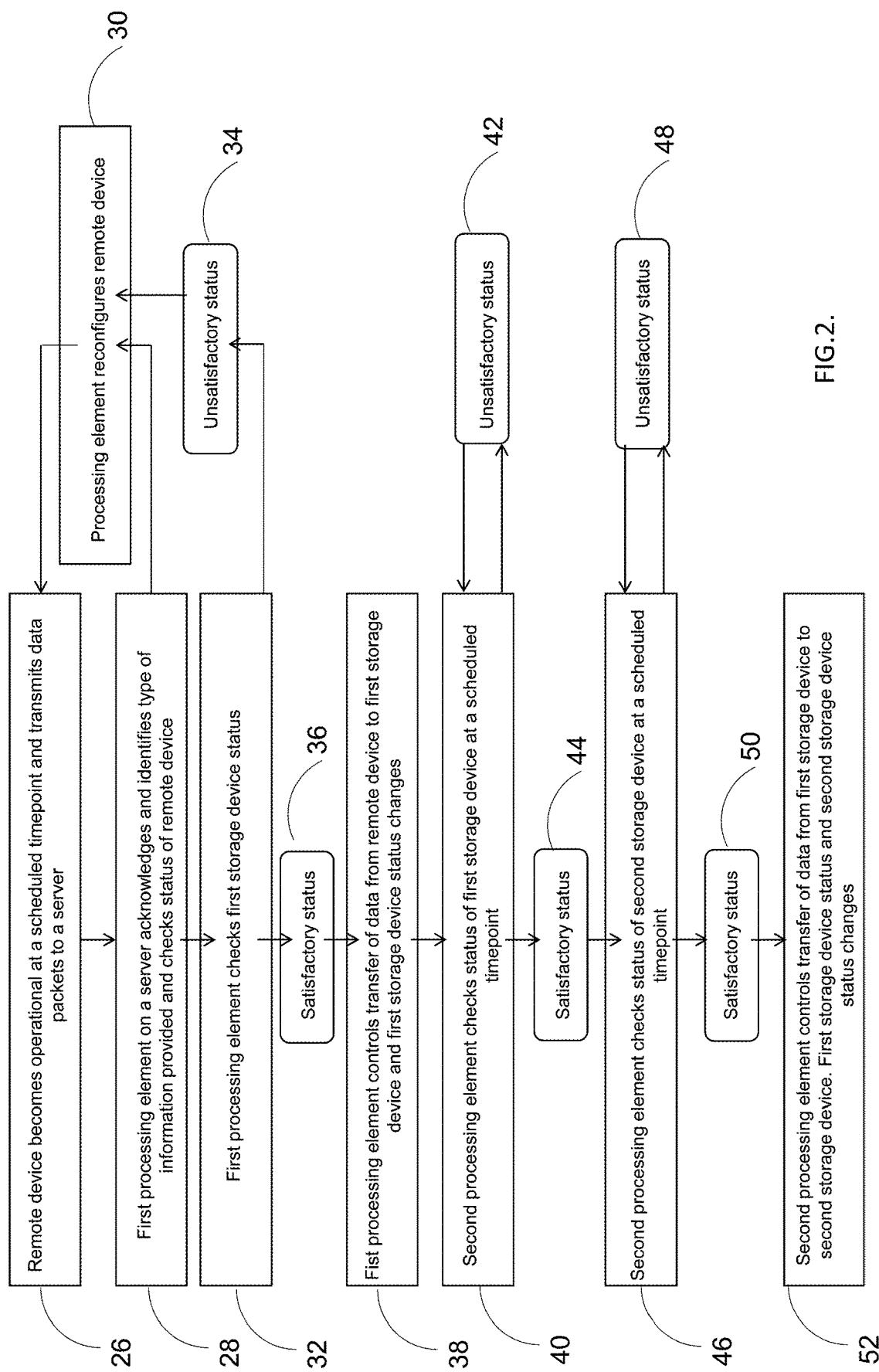
FIG. 2 shows a flow chart of operational steps of use of a cloud computing server interface from FIG. 1 using a method in accordance with the present invention.

In use, as is illustrated in FIG. 2, data loggers 12 are arranged to wirelessly communicate with the first processing element 22 located on a server 18 at predetermined time intervals 26. This communication enables the first processing element 22 to compare the current settings of the data logger 12 with the required settings 28, and in order to transmit measured environmental data, for instance, pressure and flow data. The first processing element 22 acknowledges a communicated data packet from the data logger 12, and identifies the settings of the data logger 12. The first processing element 22 is also enabled to communicate with the cache memory 20, wherein the first processing element is enabled to detect the status of the cache memory 20 as shown in FIG. 2. The status of the cache memory 20 includes the memory capacity, used by the first processing element to determine if transfer of data from the data logger 12 to the cache memory 20 is possible.

Provided the settings of the data logger 12 correspond to those required of a current predetermined protocol, and there is sufficient cache memory available 36, the first processing element 22 arranges for transfer of data from data logger 12 to the cache memory 20 shown in FIG. 2.

In the event that the settings provided by the data logger 12 do not correspond with the required settings, which may be the case if data logger 12 is a new data logger having been added to the fleet, the first processing element is arranged to provide reconfiguration instructions 30, which take the form of transmitted data packets, to the data logger 12. These reconfiguration instructions may alternatively be in response to a change in protocol applied to one or more data loggers 12 within the fleet, wherein the current settings need to be altered in one or more data loggers 12. These reconfiguration instructions may also be in response to an unsatisfactory cache memory status obtained 34 by the first processing element 22. In this event, the data logger 12 settings may be reconfigured 30 to reschedule a communication time.

Upon transfer of data from the data logger 12 to the cache memory 18 by the first processing element 22, the cache memory 20 status is altered to incorporate the new memory capacity and an indication that data transfer has been successfully concluded.

The second processing element 24 is arranged to communicate with the cache memory 20 and a hard drive 16. The hard drive 16 has a status which includes the memory capacity and an indicator of availability for data transfer. Provided the status of the cache memory 20, detected by the second processing element 24, indicates data transfer has been concluded 44, data transfer from the cache memory 20 can be facilitated by the second processing element 24. Provided the second processing element 24 detects a satisfactory hard drive status 46, 50, in that the hard drive 16 is available for data transfer and there is sufficient memory capacity 50, the second processing element 24 controls data transfer 52 from the cache memory 20 to the hard drive 16.

The above mentioned embodiments have focussed on water management systems. Alternative embodiments may include use of the present invention in other forms of utilities management, for instance in gas or electricity management. Examples of information potentially comprised within remote device status, the first storage device status and a second storage device status have been presented. It will be appreciated that the remote device status, the first storage device status and a second storage device status may further comprise additional information relating to the properties of the respective devices. Such statuses may, for instance, further comprise self-diagnostics information; time; date; software/firmware version; software/firmware update information; unique identification numbers; date of manufacture; schedule information; power information, including whether the device is on or off; and, where applicable, battery level. It will also be appreciated that further embodiments may comprise the processing, transfer and storage of information that is encrypted by at least one of: a remote device, the first processing element, the first storage device, the second processing element, a second storage device. In further embodiments, encryption and decryption may be carried out by at least one of: a remote device, the first processing element, the first storage device, the second processing element, a second storage device. Modes of communication and/or transmission of data may comprise wireless technology, radio frequency, mobile communication technology, cellular technology or other appropriate form of communications technology, which may be adapted specifically for short- or long-range transmissions.

A computer program product will be appreciated, including a program for a processing device, comprising software code portions for performing one or all of the steps of the method according to the first aspect. The computer program product discussed above may comprise a computer-readable medium on which software code portions are stored. The program may be directly loadable into an internal memory of the processing device.

One example of such a computer program product is an application, a so-called app, but alternatively, the features of the method according to the second aspect of the invention can also be realized by an operating system, a firmware and/or a hardware realizing the features.

It will be appreciated that the above described embodiments are given by way of example only and that various modifications thereto may be made without departing from the scope of the invention as defined in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

The invention claimed is:

1. A method of transferring data from a remote device to a second storage device comprising:
using a cloud computing server interface, to perform the method, the using comprising:
a first processing element acknowledging communication of a remote device;
the first processing element identifying a type of communication provided by the remote device;
the first processing element performing at least one task selected from the group consisting of:
providing reconfiguration information to the remote device; and
providing a transfer of the received information to a first storage device;
a second processing element identifying a change in a first storage device status, and proceeding to check a second storage device status at predetermined intervals; and
if the second processing element identifies a satisfactory second storage device status, the second processing element proceeding to provide transfer of information from the first storage device to a second storage device, wherein the cloud computing server interface comprises:
the first data processing element arranged to communicate with the remote device having a remote device status, wherein the first data processing element is arranged to control data transfer from the remote device to the first storage device;
the first storage device having the first storage device status, wherein the first storage device is arranged to communicate with the first data processing element and the second data processing element; and
the second data processing element arranged to communicate with the second storage device having the second storage device status, wherein the second data processing element is arranged to control data transfer from the first storage device to the second storage device, wherein data transfer from the second data processing element to the second storage device is dependent upon the second storage device status, and wherein data transferred from the second data processing element to the second storage device comprises utilities management data.

2. The method of claim 1, further comprising:
the second processing element checking the second storage device status by performing at least one activity selected from the group consisting of:
the second processing element detecting the storage capacity of said second storage device;
the second processing element detecting hardware parameters available on said second storage device;
the second processing element detecting the current activity of said second storage device;
the second processing element detecting a list of operations to be performed by said second storage device; and
the second processing element calculating an estimated time of availability for data transfer of the second processing element.

3. The method of claim 1, wherein the first processing element is arranged to compress and decompress data transferred from the remote device to the first storage device.

4. The method of claim 1, wherein the second processing element is arranged to compress and decompress data transferred from the first storage device to the second storage device.

5. The method of claim 1, wherein the communication between the first processing element and the remote device comprises at least one element selected from the group consisting of:
the first processing element identifying the remote device status; and
the first processing element providing reconfiguration instructions to the remote device; and
the first processing element providing transfer of data from the remote device.

6. The method of claim 1, wherein the communication between the first processing element and the first storage device comprises at least one element selected from the group consisting of:
the first processing element identifying the first storage device status; and
the first processing element providing data transfer to the first storage device.

7. The method of claim 1, wherein the communication between the second processing element and the first storage device comprises at least one element selected from the group consisting of:
the second processing element identifying the first storage device status; and
the second processing element providing data transfer from the first storage device.

8. The method of claim 1, wherein the communication between the second processing element and said second storage device comprises at least one element selected from the group consisting of:
the second processing element identifying the second storage device status; and
the second element providing data transfer to the second storage device.

9. The method of claim 1, wherein said remote device comprises a data logger.

10. The method of claim 1, wherein the first storage device comprises cache memory.

11. The method of claim 1, wherein said second storage device comprises a hard drive.

12. The method of claim 1, wherein the first storage device is located on a server.

13. The method of claim 1, wherein said second storage device is located on a server.

14. A computer program product comprising:
a non-transitory computer readable storage medium readable by one or more processors and storing instructions for execution by a processing device for performing a method comprising: using a cloud computing server interface, to perform the method, the using comprising:
a first processing element acknowledging communication of a remote device;

the first processing element identifying a type of communication provided by the remote device;
the first processing element performing at least one task selected from the group consisting of:
  providing reconfiguration information to the remote device; and
  providing a transfer of the received information to a first storage device;
a second processing element identifying a change in a first storage device status, and proceeding to check a second storage device status at predetermined intervals; and
if the second processing element identifies a satisfactory second storage device status, the second processing element proceeding to provide transfer of information from the first storage device to a second storage device, wherein the cloud computing server interface comprises:
  the first data processing element arranged to communicate with the remote device having a remote device status, wherein the first data processing element is arranged to control data transfer from the remote device to the first storage device:
  the first storage device having the first storage device status, wherein the first storage device is arranged to communicate with the first data processing element and the second data processing element; and
  the second data processing element arranged to communicate with the second storage device having the second storage device status, wherein the second data processing element is arranged to control data transfer from the first storage device to the second storage device, wherein data transfer from the second data processing element to the second storage device is dependent upon the second storage device status, and wherein data transferred from the second data processing element to the second storage device comprises utilities management data.

15. The computer program product of claim 14, wherein the program is directly loadable into an internal memory of the processing device.

16. The computer program product of claim 15, the method further comprising:
the second processing element checking the second storage device status by performing at least one activity selected from the group consisting of:
  the second processing element detecting the storage capacity of said second storage device;
  the second processing element detecting hardware parameters available on said second storage device;
  the second processing element detecting the current activity of said second storage device;
  the second processing element detecting a list of operations to be performed by said second storage device; and
  the second processing element calculating an estimated time of availability for data transfer of the second processing element.

17. The computer program product of claim 16, wherein the program is directly loadable into an internal memory of the processing device.

18. A cloud computing server interface comprising:
a first data processing element arranged to communicate with a remote device having a remote device status, wherein the first data processing element is arranged to control data transfer from the remote device to a first storage device;
the first storage device having a first storage device status, wherein the first storage device is arranged to communicate with the first data processing element and a second data processing element; and
the second data processing element arranged to communicate with a second storage device having a second storage device status, wherein the second data processing element is arranged to control data transfer from the first storage device to the second storage device, wherein data transfer from the second data processing element to the second storage device is dependent upon the second storage device status, wherein data transfer from the second data processing element to said second storage device comprises utilities management data, and wherein the cloud computing server interface is arranged to perform a method comprising:
  the first processing element acknowledging communication of the remote device;
  the first processing element identifying a type of communication provided by the remote device;
  the first processing element performing at least one task selected from the group consisting of:
    providing reconfiguration information to the remote device; and
    providing a transfer of the received information to the first storage device;
  the second processing element identifying a change in the first storage device status, and proceeding to check the second storage device status at predetermined intervals; and
  if the second processing element identifies a satisfactory second storage device status, the second processing element proceeding to provide transfer of information from the first storage device to the second storage device.

19. The cloud computing server interface of claim 18, the method further comprising:
the second processing element checking the second storage device status by performing at least one activity selected from the group consisting of:
  the second processing element detecting the storage capacity of said second storage device;
  the second processing element detecting hardware parameters available on said second storage device;
  the second processing element detecting the current activity of said second storage device;
  the second processing element detecting a list of operations to be performed by said second storage device; and
  the second processing element calculating an estimated time of availability for data transfer of the second processing element.

* * * * *